United States Patent [19]

Will

[11] 4,079,415
[45] Mar. 14, 1978

[54] FREQUENCY TRANSLATOR

[75] Inventor: Peter Will, Denver, Colo.

[73] Assignee: Vari-L Company, Inc., Denver, Colo.

[21] Appl. No.: 629,773

[22] Filed: Nov. 7, 1975

[51] Int. Cl.$^2$ .......................... H04N 7/10; H04B 1/06
[52] U.S. Cl. ...................................... 358/86; 325/461; 325/308
[58] Field of Search ............... 325/439, 438, 461, 483, 325/436, 308; 331/37, 117 R, 117 D; 321/60; 332/1, 18; 358/86, 188

[56] References Cited

U.S. PATENT DOCUMENTS

| 2,174,963 | 10/1939 | Braaten | 333/73 R |
|---|---|---|---|
| 2,760,061 | 8/1956 | Pan et al. | 325/461 |
| 2,789,213 | 4/1957 | Marks et al. | 325/436 |
| 3,040,255 | 6/1962 | Mukai | 325/439 |
| 3,204,199 | 8/1965 | Lance | 331/117 D |
| 3,555,430 | 1/1971 | Fischer et al. | 325/439 |
| 3,562,652 | 2/1971 | Prange et al. | 325/461 |
| 3,696,302 | 10/1972 | Gossard | 325/461 |
| 3,730,980 | 5/1973 | Kirk | 325/308 |
| 3,737,784 | 6/1973 | Dostis | 325/439 |
| 3,742,131 | 6/1973 | Rogeness | 325/461 |

OTHER PUBLICATIONS

Carlson, *Communication Systems: An Introduction to Signals and Noise in Electrical Communication*, McGraw Hill, 1968, p. 425.

Terman, *Radio Engineers' Handbook*, 1st Edition, McGraw Hill, 1943, pp. 228, 229.
Black, *Modulation Theory*, Van Nostrand Co., 1953, p. 146.

*Primary Examiner*—John C. Martin
*Attorney, Agent, or Firm*—Ancel W. Lewis, Jr.

[57] ABSTRACT

In a frequency translator for r-f television signals and the like there is provided an input frequency selective matching network to pass only r-f television signals in a predetermined range of about 50 to 300 MHz (vhf), a novel combination oscillator, impedance matching network, and mixer arranged for mixing incoming television signals from a cable or antenna with a preselected reference signal of a constant frequency generated by the oscillator to produce output signals from the mixer in a higher band of frequencies of about 500 to 750 MHz (uhf). An output frequency selective matching network passes only signals in said second band of frequencies to an output terminal. The impedance matching network provides a conjugate match for the output impedance of the oscillator and the input impedance of the mixer so as to inhibit the reflection of undesirable signal products from the mixer back to the oscillator and minimize power loss. The output frequency selective network and mixer arrangement do not require an active gain stage and an associated additional frequency selective matching networks in an input circuit ahead of the mixer.

19 Claims, 2 Drawing Figures

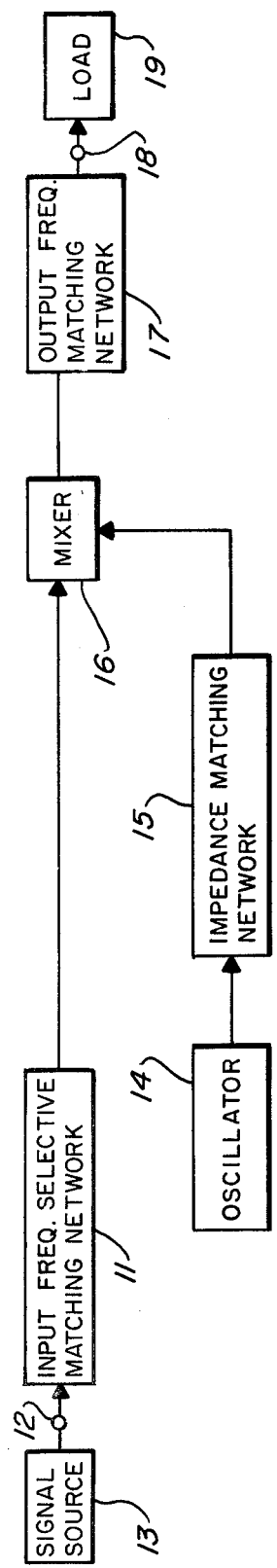
*Fig_1*
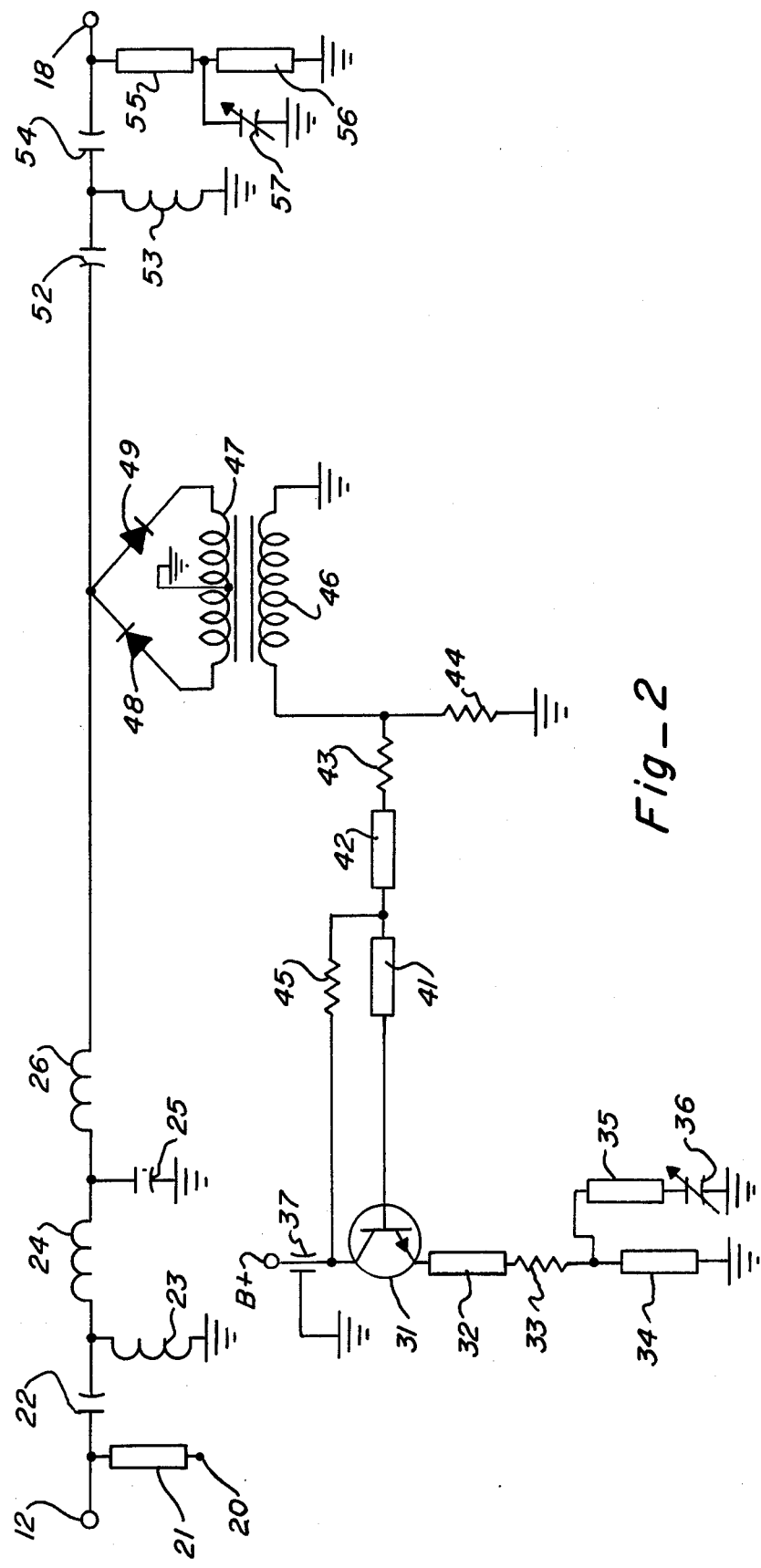
*Fig_2*

FREQUENCY TRANSLATOR

FIELD OF THE INVENTION

This invention relates to a novel and improved frequency translator that is highly effective in a CATV system for converting television signals in a vhf band supplied from a cable or antenna to a uhf band that is applied to a television set uhf tuner.

BACKGROUND OF THE INVENTION

Frequency translators for changing or translating r-f signals from one band of frequencies to another band of frequencies have heretofore been used extensively in the communications field. A more specific application for such frequency translators is for television signals in a CATV system to convert vhf signals from a cable to uhf signals capable of being applied to the television set uhf tuner.

A desirable criterion for a frequency translator for use in a CATV system includes the following:

(1) Low noise
(2) Low conversion loss
(3) High amplitude and phase conversion linearity
(4) Minimum spurious and harmonic modulation signal product generation
(5) Stable and accurate frequency conversion over a long time period without undue temperature variation effects
(6) Minimum oscillator signal emission at both input and output terminals.

Prior known frequency translators utilized for CATV systems have required relatively complex circuitry and as a result have been relatively expensive. A common approach of prior known frequency translators for CATV systems has been to utilize an active amplification stage such as a transistor in the input impedance matching and filtering network to compensate for relatively high conversion losses associated with a doubly balanced-type mixer and an output impedance matching or filter network. Moreover, the conventional approach in these frequency translators has been to utilize an active amplification stage usually including a transistor between the local oscillator and the mixer which functions as a unidirectional device to block or eliminate mixer-oscillator interaction. This blocking device has heretofore been a high reverse isolation buffer amplifier or a high reverse gyromagnetic isolator or circulator and functioned to minimize or eliminate unwanted signal products produced in the mixer from reflecting back to the oscillator which ultimately would alter the quality of the output signal from the mixer.

Prior known frequency translators for CATV systems in general have not been directed to circuit simplification and efficiency and have not recognized alternatives to the amplification of the input signal to make up for conversion losses or elimination of an active high reverse blocking device between the oscillator and the mixer and have not provided the most effective oscillators for this purpose.

Accordingly, the present invention is directed to achieving a novel and improved frequency translator for converting r-f television signals to a different frequency band in a highly efficient manner without sacrificing overall performance.

Another object of this invention is to provide a novel frequency translator capable of achieving the aforementioned desirable criteria in a highly efficient manner with a minimum of circuit components.

Still another object of this invention is to provide a novel and improved frequency translator for CATV systems characterized by the conjugate matching of the impedance between an improved oscillator and a singly balanced diode mixer to achieve the elimination of mixer-oscillator interaction, eliminate unwanted harmonic products in the output signal from the mixer, and reduce power losses.

Yet another object of this invention is to provide a novel and improved frequency translator for CATV systems that eliminates the need for an amplification stage for the incoming r-f television signal prior to its being applied to the mixer.

A further object of the present invention is to minimize this oscillator-mixer interaction by a simple means eliminating the need for a high reverse isolation buffer amplifier or a high reverse isolation (or circulator or any other) gyromagnetic isolator.

Other objects, advantages and capabilities of the present invention will become more apparent as the description proceeds taken in conjunction with the accompanying drawings, in which like parts have similar reference numerals and in which:

FIG. 1 is a schematic block diagram of a frequency translator embodying features of the present invention; and FIG. 2 is a schematic electric circuit diagram illustrating a preferred embodiment of a frequency translator constructed in accordance with the present invention.

DEFINITION OF TERMS

Conversion loss - The ratio of the available intermediate frequency (i-f) output power to the available radio frequency (r-f) input power.

Injection locking - The attempt of an oscillator to synchronize its output oscillations to the frequency of oscillation of an external signal which is introduced at a point within the oscillator's frequency determining element, feedback loop or output load.

Conjugate match - The conditions which maximize the power transfer between a pair of two port networks obtained when their resistive components of their complex impedances are equal and their reactive components are equal in magnitude but of opposite signs. The mixer impedance is the complex conjugate of the oscillator impedance. If the system is opened between the mixer and the oscillator, the impedances looking in opposite directions are the conjugates of each other and this condition produces maximum power transfer.

L - Length of transmission line.

$\lambda$ - Full wavelength.

r-f - Radio frequency incoming television signal applied to the input terminal 12. Example frequency band is 50 to 300 MHz.

$f_o$ - Frequency of the output of the oscillator. Example frequency 800 MHz.

$f_{r\text{-}f}$ - Frequency of the incoming television signal.

$f_{r\text{-}f(1)}$ - Frequency of a first specific incoming television signal.

$f_{r\text{-}f(2)}$ - Frequency of a second specific incoming television signal.

$N_{f_o}$ - Integer of the frequency of the oscillator.

$M_{f_{r\text{-}f}}$ - Integer of the frequency of the incoming r-f television signals.

Second order distortion product - $f_o \pm f_{r-f(1)} \pm f_{r-f(2)}$
Third order distortion products - $f_o\, 2f_{r-f(1)} \pm f_{r-f(2)} f_o \pm f_{r-f(1)} \pm 2f_{r-f(2)}$ A frequency translator embodying features of the present invention includes the basic portions or stages illustrated generally in block diagram form in FIG. 1. In general, these stages include an input frequency selector matching network 11 with an input terminal 12 coupled to a cable, antenna or like source of r-f television signals in FIG. 1 represented as a signal source at 13. A combination oscillator 14, impedance matching network 15 and mixer 16 are provided together with an output frequency selective matching network 17 having an output terminal 18 that couples to a load 19 which is in most instances a commercial television set uhf tuner.

The following circuit description will refer to example frequencies and values that are particularly suitable for television signals using an 800 MHz oscillator signal and an input signal frequency range of 50 MHz to 300 MHz.

The input frequency selective matching network 11 shown in the preferred embodiment of FIG. 2 has a shunt impedance 21 connected to the input terminal with the opposite end thereof designated 20 open or ungrounded to present a shunt or short circuit to any 800 MHz oscillator signal present at the input terminal 12 to prevent the oscillator from emitting a signal back to the CATV system via terminal 12. A series capacitor 22 connects to the input terminal 12 and a shunt inductor 23 connected to series capacitor 22 from a high-pass filter allowing only frequencies above 50 MHz to enter the mixer. A series inductor 24 connects to series capacitor 22 and shunt inductor 23 and, together with a shunt capacitor 25 connected to series inductor 24 and a second series inductor 26 connected to the series inductor 24 and the shunt capacitor 25, form a low-pass filter allowing signals below 300 MHz to reach the mixer. In this way elements 21–26 form a frequency selective matching network or bandpass filter for input signals capable of selecting frequencies between 50 MHz and 300 MHz and rejecting frequencies below and above 50 MHz and 300 MHz, respectively.

The oscillator shown in FIG. 2 comprises an NPN transistor 31 with base, collector and emitter electrodes and emitter-base and collector-base junctions. Transistor 31 is the active element of the oscillator and selected to produce the desired oscillator signals. A frequency determining network and bias circuit is connected between the emitter electrode and ground and this circuit includes a series circuit inclusive of an impedance 32, a resistor 33, and an impedance 34. Another series circuit is connected across impedance 34 and this includes impedance 35 and a variable capacitor 36 so that the changing of the setting of the capacitor 36 varies the frequency of the oscillations produced in the transistor 31. The values of this frequency determining network and biasing element have a phase change versus frequency change on the order of magnitude that is considerably greater than the prior art and makes the oscillator much less susceptible to injection locking to undesired signals. Conventional uhf oscillators have a phase change versus frequency of about 0.5 degrees per MHz and the preferred embodiment of about 5 degrees per MHz.

A feed-through capacitor 37 is used to couple the collector electrode to a point of substantially zero r-f potential. The feed-through capacitor has a center conductor connected at one end to the collector electrode; the other end of the center conductor forms a bias voltage terminal designated B+. This feed-through arrangement serves to provide a r-f ground for the collector electrode and a bias or supply voltage for the transistor.

The impedance matching network shown in FIG. 2 includes a series circuit between the base electrode and the mixer of an impedance 41, an impedance 42 and a resistor 43. Included in this impedance matching network is a shunt resistor 44 connected to the mixer and to resistor 43. Also included in this network is a resistor 45 connected between the collector electrode and resistors 41 and 42. This network is used to provide the correct D.C. bias to the base electrode of the transistor and also provides an r-f impedance conjugate match between the base electrode (oscillator output) and the input of the mixer, and in this way it has been found possible to eliminate the reflection of unwanted signal products produced in the mixer back to the oscillator and prevent subsequent translation of said unwanted signal products into the output signals of the mixer as interference products as well as reduce power loss.

The mixer shown in the circuit of FIG. 2 is of the single balanced type and comprises a transformer having a r-f primary winding 46 and a secondary winding 47, the secondary winding being center-tapped and connected to ground. One side of the secondary winding is connected to the common junction of resistors 43 and 44 and the other side is connected to ground. Across the secondary winding there are connected two diodes 48 and 49 that are in series with one another and the common connection therebetween forms the output terminal of the mixer which connects to the output of the input frequency selective network and specifically one side of inductor 26 and capacitor 52. The r-f primary winding 46 then couples the output signal of the oscillator to the secondary winding 47 which in turn couples the signal to the diodes 48 and 49. The diodes 48 and 49 are of the "hot carrier" or the "Schottky" type and generate oscillator and r-f television input signal products described hereinafter.

This combination of oscillator with its impedance matching and transistor biasing network provides the oscillator transistor 31 with correct D.C. conditions for operation, maximizes power transfer from the oscillator transistor to the mixer, and prevents the magnitude of the term $f_o \pm [f_r - f_{(1)}] - [f_r - f_{(2)}]$ that is generated within the mixer from reaching the oscillator by absorption. This latter item is accomplished by having an impedance matching network that presents a conjugate match to the mixers $f_o \pm [f_{r-f(1)}] - [f_{r-f(2)}]$ source impedance as described more fully hereinafter.

In the preferred embodiment shown in FIG. 2, the output frequency selective matching network is shown to comprise a series capacitor 52 connected to the mixer, or more specifically to inductor 26 and diodes 48 and 49, a shunt inductor 53 connected to the series capacitor, a series capacitor 54 connected to the series capacitor 52 and to the shunt inductor 53, two shunt impedances 55 and 56 connected in series with one another and with the series capacitor 54, and a variable capacitor connected across shunt impedance 56.

Elements 52, 53 and 54 comprise a high pass filter which select the desired output frequency products generated by the mixer. The input frequency selective matching network and output frequency selective mtching network are untuned and are broadband in their operation and they are constructed using low-loss high "Q" circuit elements. The signal losses associated with these two networks are low, typically less than 1 db; therefore, additional amplification in the input frequency matching network is not required. Tuned narrowband networks used in the prior art have losses of typically 2-4 db each; therefore, if tuned networks were used, an active stage of amplification would be necessary to compensate for the narrowband network's additional losses.

OPERATION

Of particular significance in the operation of the above circuit is the achieving of a frequency conversion function without undesirable interaction between the oscillator and the mixer. In a full sequence of operation a D.C. voltage and current is applied to the frequency translator at the power supply terminal B+. Internal capacitance on the order of 1-3 pf within the transistor 31 causes feedback within the transistor 31 to occur, producing oscillations, their frequency being primarily determined by the frequency determining network and bias circuit above described which is adjusted by the setting of capacitor 36. The oscillations or signal present at the base electrode of transistor 31 are coupled to the mixer by means of the combination impedance matching and bias network.

The oscillator signals are coupled from the impedance matching network to the mixer diodes 48 and 49 through the r-f transformer primary 46 and secondary 47. The oscillator's signal acts upon the diodes 48 and 49 by alternately causing the diodes to conduct when they are formed biased and not to conduct when they are reverse biased. Their resistance therefore becomes low, on the order of 10-25 ohms, in the conducting state and high, on the order of several thousands ohms, in the non-conducting state, respectively.

Incoming r-f television signals within the approximate range of 50 to 300 MHz, inclusive, are allowed to pass from the frequency converter's input terminal 12 through the input frequency selective matching network to the common junction of diodes 48 and 49. The diodes act upon the incoming r-f television signal as follows:

A diode mixer, when driven by an oscillator sufficiently large in amplitude to cause abrupt discontinuity on-off switching of the diodes, would produce ideally $f_o \pm f_{r-f}$ only. However, diode nonlinearities cause additional harmonically related products to be produced within the mixer's diodes. Among these are:

(1) $Nf_o$ and $M f_{r-f}$
(2) $Nf_o \pm M f_{r-f}$
(3) $f_{r-f(1)} \pm f_{r-f(2)}$
(4) $f_o \pm f_{r-f(1)} \pm f_{r-f(2)}$
(5) $Nf_o \pm M f_{r-f(1)} \pm M f_{r-f(2)}$ The usual approach to design a mixer for similar purposes has been to maximize for $f_o +$ or $- f_{r-f}$ dependent upon whichever output is desired. The output frequency selective matching network of the present invention selects these desired terms, both $f_o - f_{r-f}$ and $f_o + f_{r-f}$ and allows them to be conducted to the output terminal 18, while rejecting or minimizing the transmission of unwanted frequency terms or products generated within the mixer to the output terminal 18. Some work is usually done to minimize the "second order distortion products" and the "third order distortion products". These haromically related distortion products appear in the output of the conventional mixer, whether it is balanced or unbalanced variety. They also appear at the input of the oscillator although they are greatly diminished in a balanced design, typically 30 db less than an unbalanced design.

A particularly troublesome product present at the oscillator input of a mixer is $f_o \pm [f_{r-f(1)}] - [f_{r-f(2)}]$. When the frequency separation between $f_{r-f(1)}$ and $f_{r-f(2)}$ is small compared to the local oscillator frequency, i.e., $\leq 1.0\%$, this term $f_o \pm [f_{r-f(1)}] - [f_{r-f(2)}]$ is very close to the oscillator's operating frequency. The product $f_o \pm [f_{r-f(1)}] + [f_{r-f(2)}]$ is usually large in frequency and therefore does not occur close to the oscillator's frequency. For example, consider the following frequencies:

$$f_o = 800 \text{ MHz}, f_{r-f(1)} = 76 \text{ MHz}, f_{r-f(2)} = 82 \text{ MHz}$$

$f_o \pm f_{r-f(1)} - f_{r-f(2)}$ would be products of 794 MHz or 806 MHz, which are sufficiently close to 800 MHz to potentially cause injection locking. If the magnitude of these products is sufficient at the time it reaches the oscillator's frequency determining network, the oscillator will attempt to "injection-lock" to the said close term or product. This causes a frequency instability or modulation of the local oscillator, producing effects upon the mixer's desired output signals which appear to be mixer generated distortions of the second and third order class.

Elements 55, 56 and 57 connected as shown are in effect what may be termed a "narrowband", "notch" or "band stop" filter in that together they form a high impedance transmission line which in the preferred embodiment is on the order of 300 ohms characteristic impedance having an electrical length of 180° at $f_o$. The purpose of this circuit is to provide a short circuit to $f_o$ at the output terminal 18. This circuit is charcterized by having a high reactance slope to attenuate $f_o$ greatly on the order of 30 db but allow an output band of signals from the mixer to be transmitted with less than 1 db of attentuation even though the output band of frequencies from the mixer is relatively close to $f_o$, i.e., less than a 7% difference.

A simple proof exists to verify that this effect is modulation of the oscillator in that the relative magnitude of the distortion products change as a function of $f_{r-f(1)}$ and $f_{r-f(2)}$ frequency separation. These products do not change in magnitude as a function of frequency separation when sufficient reverse isolation or buffering is placed between the mixer and local oscillator. The mixer production of the term $f_o \pm [f_{r-f(1)}] - [f_{r-f(2)}]$ has been found to be independent of frequency separation by using a high gain, high reverse isolation amplifier and directional coupler sampling means.

In the foregoing circuit the minimization of interaction between the oscillator and mixer is accomplished in two ways: (1) design of an oscillator circuit that is less susceptible to injection locking, (2) minimization and control of the magnitude of the term $f_o \pm [f_{r-f(1)}] - [f_{r-f(2)}]$.

The preferred embodiment accomplishes the above items by means of the following: (1) a combination frequency determining network and bias element shown connected to the emitter electrode of the transistor having a phase change versus frequency change on order of magnitude greater than the prior art, thus making the "preferred embodiment" local oscillator much less susceptible to "injection-locking" to undesired signals, and (2) an impedance matching and transistor biasing network to accomplish the provision of the oscillator transistor with correct D.C. conditions for operation, maximize power transfer from the oscillator transistor to the mixer, and the prevention of the term $f_o \pm f_{r-f(1)} - f_{r-f(2)}$ that is generated within the mixer from reaching the local oscillator by absorption. Again, this latter is accomplished by having an impedance matching network that presents a conjugate match to the mixer's input impedance.

By way of illustration only and not by way of limitation, there are listed below devices which have been found suitable for use in the illustrated circuit:

| Device | Value | |
|---|---|---|
| Impedance 21 | 75 ohm coaxial Trans. Line | L = λ/4 |
| Impedance 32 | 50 ohm coaxial Trans. Line | L = λ/20 |
| Resistor 33 | 20 ohm | |
| Impedance 34 | 50 ohm coaxial Trans. Line | L = λ/20 |
| Impedance 35 | 50 ohm coaxial Trans. Line | L = λ/8 |
| Capacitor 36 | 0.8 - 3.0 pf | |
| Capacitor 37 | 470 pf | |
| b+ | 15 volts D.C. | |
| Impedance 41 | 50 ohm coaxial Trans. Line | L = λ/20 |
| Impedance 42 | 17 ohm coaxial Trans. Line | L = λ/4 |
| Resistor 43 | 120 ohm | |
| Resistor 44 | 62 ohm | |
| Resistor 45 | 1.2 K ohm | |
| Impedances 55,56 | 370 ohm helical Trans. Line | L = λ/4 |
| Capacitor 57 | 0.8 - 3.0 pf | |

All transmission line wavelengths (L) are referenced to the wavelength of the frequency of the oscillation herein referred to as 800 MHz.

Although the present invention has been described with a certain degree of particularity, it is understood that the present disclosure has been made by way of example and that changes in details of structure may be made without departing from the spirit thereof.

What is claimed is:

1. In a frequency translator for r-f television signals and the like, the combination comprising:
    (a) an input frequency selective matching network for passing incoming signals only in a first predetermined band of frequencies and ground other unwanted signal products;
    (b) an oscillator including an active element with first, second and third electrodes for generating a reference signal having a selected substantially constant frequency, said oscillator including a circuit element means coupling one of said first and second electrodes to an r-f ground and coupled at one end to said one electrode and at the other end to a bias voltage to provide an r-f ground and bias voltage for said active element, and a frequency determining impedance network coupled to the other of said first and second electrodes including a variable capacitor whereby the changing of the setting of said capacitor varies the frequency of oscillations in said active element, said oscillator having an output impedance;
    (c) a mixer for mixing incoming signals in a first predetermined band of frequencies with said reference signal to produce output signals in a second band of frequencies, said mixer having an output impedance;
    (d) an impedance matching network operatively associated with said third electrode for conjugate matching the output impedance of said oscillator with the input impedance of said mixer to substantially eliminate by absorption the reflection of unwanted signal products produced in said mixer back to said oscillator and prevent a modulation of said oscillator by mixer-produced unwanted signals which ultimately would appear as a subsequent translation of said unwanted signal products into the output signals in said second band of frequencies as interference products and for providing a bias for said active element; and
    (e) an output frequency selective matching network for passing output signals from said mixer in only said second band of frequencies to said output terminal.

2. In a frequency translator as set forth in claim 1 wherein said input and output frequency selective matching networks are untuned and broadband with high "Q" elements and having less than about 1 db loss.

3. In a frequency translator as set forth in claim 1 wherein said input and output frequency selective matching network is of a low loss character to eliminate the necessity of an active gain stage between said input and output frequency selective matching networks.

4. In a frequency translator as set forth in claim 1 wherein said output frequency selective matching network has a notch filter arranged to provide a short circuit for the reference signals from the oscillator and at the same time pass a band of signals in said second band of frequencies that are relatively close to said reference signal with less than about a 7% difference.

5. In a frequency translator for r-f television signals and the like, the combination comprising:
    an oscillator for generating a reference signal having a selected substantially constant frequency, said oscillator including a solid state active element having a first electrode, a second electrode and a third electrode, a circuit element means coupling one of said first and second electrodes to an r-f ground and coupled at one end to said one electrode and at the other end to a bias voltage terminal to provide an r-f ground and a bias voltage for said active element, and a frequency determining impedance network coupled to the other of said first and second electrodes including a variable capacitor whereby the changing of the setting of said capacitor varies the frequency of oscillations in said active element, said oscillator having an output impedance;
    a mixer for mixing incoming signals in a first predetermined band of frequencies with said reference signal to produce output signals in a second band of frequencies, said mixer having an output impedance; and
    an impedance matching network operatively associated with said third electrode for conjugate matching the output impedance of said oscillator with the input impedance of said mixer to substantially eliminate the reflection of unwanted signal products produced in said mixer back to said oscillator and prevent subsequent translation of said unwantedk signal products into the output signals in said second band of frequencies as interference products.

6. In a frequency translator as set forth in claim 5 further including an input frequency selective matching network for passing incoming signals to said mixer in only said first predetermined band of frequencies.

7. In a frequency translator as set forth in claim 6 wherein said input frequency selective matching network includes:
(a) a shunt impedance connected at one side to the input terminal having the opposite side open to prevent signals produced by said oscillator from passing back to the source of said r-f television signals,
(b) a high pass filter including a series capacitor connected to the input terminal and a shunt inductor connected to the series capacitor for allowing only signals having frequencies above a selected lower frequency to pass,
(c) a low pass filter including a first series inductor connected to said series capacitor and said shunt inductor, a shunt capacitor connected to the series inductor, and a second series inductor connected to the first series inductor and to said shunt capacitor for allowing signals having frequencies below a selected higher frequency to pass.

8. In a frequency translator as set forth in claim 7 wherein said shunt impedance is in the form of a coaxial transmission line having a length related to the frequency of said oscillator.

9. In a frequency translator as set forth in claim 5 wherein said input television signals are in the range of about 50 to 300 MHz.

10. In a frequency translator as set forth in claim 5 wherein said output signals are in the range of about 500 to 750 MHz.

11. In a frequency translator as set forth in claim 5 wherein said reference signal is about 800 MHz.

12. In a frequency translator as set forth in claim 5 wherein said impedance matching network includes:
(a) a first series impedance coupled to said third electrode of said active element,
(b) a second series impedance coupled to said first series impedance,
(c) a series resistor connected between said second series impedance and said mixer,
(d) a shunt resistor connected to said series resistor and to the input of said mixer, and
(e) a first resistor connected between said first and second series impedances and one of said first and second electrodes of said active element whereby to bias said active element and prevent unwanted products generated by said mixer to reach said active element while at the same time afford maximum power transfer from the active element to said mixer.

13. In a frequency translator as set forth in claim 5 wherein said mixer is of the singly balanced type and includes:
(a) a transformer having a r-f primary winding and a secondary winding, said primary winding being coupled to said impedance matching network, and
(b) a first diode connected to one side of said secondary winding and a second diode connected to the opposite side of said secondary winding with opposite sides of said diode being connected together at an output terminal for said mixer.

14. In a frequency translator as set forth in claim 5 wherein said active element is a transistor having a base, collector and emitter electrodes, said circuit element means being a feed-through capacitor coupling one of said collector and emitter electrodes to an r-f ground, said feed-through capacitor having a feed-through center conductor coupled at one end to said one electrode and at the other end to a bias voltage terminal, said frequency determining network being coupled between one of said collector and emitter electrodes and the bias voltage terminal and ground, said impedance network including a first series circuit having a first impedance, a resistor, and a second impedance, and a second series circuit connected across said second impedance having a third impedance and variable capacitor whereby the changing of the setting of said capacitor varies the frequency of oscillations in said active element.

15. In a frequency translator as set forth in claim 14 wherein said first, second and third impedances are each in the form of a coaxial transmission line having a length related to the frequency of said oscillator.

16. In a frequency translator as set forth in claim 14 wherein said oscillator frequency determining impedance network has a phase change versus frequency of about 5° per MHz.

17. In a frequency translator as set forth in claim 14 wherein said feed-through capacitor is coupled to said collector electrode and said frequency determining impedance network is coupled to said emitter electrode.

18. In a frequency translator for r-f television signals and the like, the combination comprising:
an oscillator for generating a reference signal having a selected substantially constant frequency, said oscillator having an output impedance;
a mixer for mixing incoming signals in a first predetermined band of frequencies with said reference signal to produce output signals in a second band of frequencies, said mixer having an output impedance;
an impedance matching network for conjugate matching the output impedance of said oscillator with the input impedance of said mixer to substantially eliminate the reflection of unwanted signal products produced in said mixer back to said oscillator and prevent subsequent translation of said unwanted signal products into the output signals in said second band of frequencies as interference products; and
an output frequency selective matching network for passing output signals from said mixer in only said second band of frequencies to said output terminal, said output frequency selective matching network including a high pass filter having a first series capacitor coupled to the mixer, a shunt inductor coupled to said first series capacitor and a second series capacitor coupled to said first series capacitor and to said shunt inductor for allowing only signals having frequencies above a selected higher frequency to pass,
said output frequency selective network further including a band stop filter inclusive of two shunt impedances connected in series with one another and to the second series capacitor, and a variable capacitor connected across one of said shunt impedances to select certain frequency products, said band stop filter providing an attenuation of reference signals from said oscillator and passing desired signals from the mixer that are close in frequency to said reference signals.

19. In a frequency translator as set forth in claim 18 wherein said two shunt impedances are each in the form of a helical transmission line having a length related to the frequency of the oscillator.

* * * * *